(12) United States Patent
Marsolek

(10) Patent No.: US 11,207,995 B2
(45) Date of Patent: Dec. 28, 2021

(54) SYSTEM AND METHOD FOR CHARGING MACHINES

(71) Applicant: Caterpillar Paving Products Inc., Brooklyn Park, MN (US)

(72) Inventor: John L. Marsolek, Watertown, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 356 days.

(21) Appl. No.: 16/505,115

(22) Filed: Jul. 8, 2019

(65) Prior Publication Data

US 2021/0008997 A1 Jan. 14, 2021

(51) Int. Cl.
| | |
|---|---|
| *B60L 53/30* | (2019.01) |
| *B60L 53/31* | (2019.01) |
| *B60L 53/66* | (2019.01) |
| *G05D 1/02* | (2020.01) |
| *G06Q 50/08* | (2012.01) |
| *E01C 19/48* | (2006.01) |

(52) U.S. Cl.
CPC .......... *B60L 53/305* (2019.02); *B60L 53/31* (2019.02); *B60L 53/66* (2019.02); *E01C 19/48* (2013.01); *G05D 1/021* (2013.01); *G06Q 50/08* (2013.01); *B60L 2200/44* (2013.01); *G05D 2201/0213* (2013.01)

(58) Field of Classification Search
CPC ........ B60L 53/305; B60L 53/66; B60L 53/31; B60L 2200/44; E01C 19/48; G05D 1/021; G05D 2201/0213; G06Q 50/08

USPC ......................................................... 701/50
See application file for complete search history.

(56) References Cited

U.S. PATENT DOCUMENTS

| | | | |
|---|---|---|---|
| 8,340,438 B2 * | 12/2012 | Anderson | G05D 1/0246 |
| | | | 382/224 |
| 9,851,213 B2 | 12/2017 | Oh et al. | |
| 2005/0156562 A1 | 7/2005 | Cohen et al. | |
| 2013/0290062 A1 | 10/2013 | Patel et al. | |
| 2015/0298565 A1 | 10/2015 | Iwamura et al. | |
| 2017/0282735 A1 | 10/2017 | Yamamura et al. | |

FOREIGN PATENT DOCUMENTS

| | | |
|---|---|---|
| EP | 2717016 | 4/2014 |
| JP | 2008069517 | 3/2008 |
| JP | 6420120 | 5/2016 |
| WO | WO2015/051876 | 4/2015 |

\* cited by examiner

*Primary Examiner* — Gertrude Arthur Jeanglaude
(74) *Attorney, Agent, or Firm* — Lee & Hayes, PLLC

(57) ABSTRACT

A method includes causing, with a controller, operation of a first compaction machine at a worksite based at least in part on a worksite plan. The method also includes determining, with the controller, a return path extending from a current location of the first machine to a charging zone located at the worksite, and determining, with the controller, a return power required for the first machine to traverse the return path. The method further includes causing, with the controller, the first machine to traverse the return path, from the current location to the charging zone, based on at least one of the return power and an amount of available power stored in an energy storage device of the first machine.

20 Claims, 4 Drawing Sheets

SYSTEM AND METHOD FOR CHARGING MACHINES

TECHNICAL FIELD

The present disclosure relates to a paving system. More specifically, the present disclosure relates to a paving system including a control system configured to control refueling and/or recharging various machines.

BACKGROUND

Haul trucks, paving machines, compaction machines, and other paving equipment are often used to perform a variety of tasks associated with a worksite. For example, one or more haul trucks may be used to transport paving material from a paving material plant to a worksite so that the paving material can be distributed along a work surface of the worksite by one or more paving machines. One or more compaction machines may follow behind the paving machine, and may be operable to compact the freshly-laid paving material to a desired density or stiffness. Such paving equipment may be powered by diesel fuel, battery power, solar power, fuel cells, or by other means, and in some examples, one or more of the machines described above may be autonomously or semi-autonomously controlled. Regardless of the manner in which such paving equipment is powered or controlled, the use of such paving equipment at a worksite requires refueling and/or recharging of the equipment at various times during the work day. The refueling and/or recharging of this equipment must be coordinated effectively in order to minimize work stoppages and to maximize efficiency at the worksite.

An example system for coordinating the activities of paving machines is described in U.S. Patent Application Publication No. 2013/0290062 (hereinafter referred to as the '062 reference). In particular, the '062 reference describes a system for implementing a computer-based method of coordinating activities associated with paving a roadway. The '062 reference describes, for example, a server configured to provide communication among system components. As explained in the '062 reference, the server may receive a communication from a transport truck indicating that a batch of paving material has been delivered to the roadway, and such a communication may be generated automatically by a truck computer system in conjunction with a global positioning system (GPS) receiver on the truck. The '062 reference does not, however, describe managing the refueling and/or recharging of various paving equipment at the worksite. As a result, work stoppages caused by, for example, refueling of such paving equipment may periodically occur, and the overall efficiency of the system described in the '062 reference may suffer.

Example embodiments of the present disclosure are directed toward overcoming the deficiencies described above.

SUMMARY

In an example embodiment of the present disclosure, a method includes receiving, with a controller, first information indicative of a paving plan associated with a worksite, receiving, with the controller, second information indicative of a perimeter of the worksite, and generating, with the controller, a worksite plan based at least in part on the first information and the second information. The method also includes causing, with the controller, operation of a first autonomous machine at the worksite based at least in part on the worksite plan. The method further includes determining, with the controller, a return path extending from a current location of the first machine to a charging zone located at the worksite, and determining, with the controller, a return power required for the first machine to traverse the return path. The method further includes causing, with the controller, the first machine to traverse the return path, from the current location to the charging zone, based on at least one of the return power and an amount of available power stored in an energy storage device of the first machine.

In another example embodiment of the present disclosure, a paving system includes a compaction machine configured to act on paving material at a worksite, the compaction machine being powered, at least in part, by an energy storage device. The paving system also includes a location sensor connected to the compaction machine and configured to determine a current location of the compaction machine at the worksite. The paving system further includes a charging zone located at the worksite, the charging zone having a charging station configured to direct energy to the energy storage device. Additionally, the paving system includes a controller configured to perform a plurality of operations. In such examples, the plurality of operations includes generating a worksite plan based at least in part on a paving plan associated with the worksite, causing operation of the compaction machine at the worksite based at least in part on the worksite plan, and determining a return path extending from the current location of the compaction machine to the charging zone. The plurality of operations also includes determining a return power required for the compaction machine to traverse the return path. The plurality of operations further includes causing the compaction machine to traverse the return path, from the current location to the charging zone, based on at least one of the return power and an amount of available power stored in the energy storage device.

In yet another example embodiment of the present disclosure, a control system includes a first controller, a second controller disposed on a compaction machine at a worksite, and a location sensor disposed on the compaction machine and operably connected to the second controller, the location sensor being configured to determine a current location of the compaction machine at the worksite. The control system also includes a third controller operably connected to a charging station of a charging zone disposed at the worksite, the charging station being configured to direct power to an energy storage device of the compaction machine. The control system further includes a network configured to transmit signals between the first controller, the second controller, and the third controller. In such examples, the first controller is configured to provide first instructions to the second controller via the network which, when executed by the second controller, cause operation of the compaction machine at the worksite based at least in part on a worksite plan. The first controller is also configured to receive operating information via the network, the operating information including the current location of the compaction machine at the worksite and an amount of available power stored in an energy storage device of the compaction machine. The first controller is also configured to determine a return path extending from the current location of the compaction machine to the charging zone, and determine a return power required for the compaction machine to traverse the return path. The first controller is further configured to provide second instructions to the second controller via the network which, when executed by the second controller, cause the compaction machine to traverse the return path, from the current location to the charging zone, based on at least one of the return power and the amount of available power.

DETAILED DESCRIPTION

Figure 1:
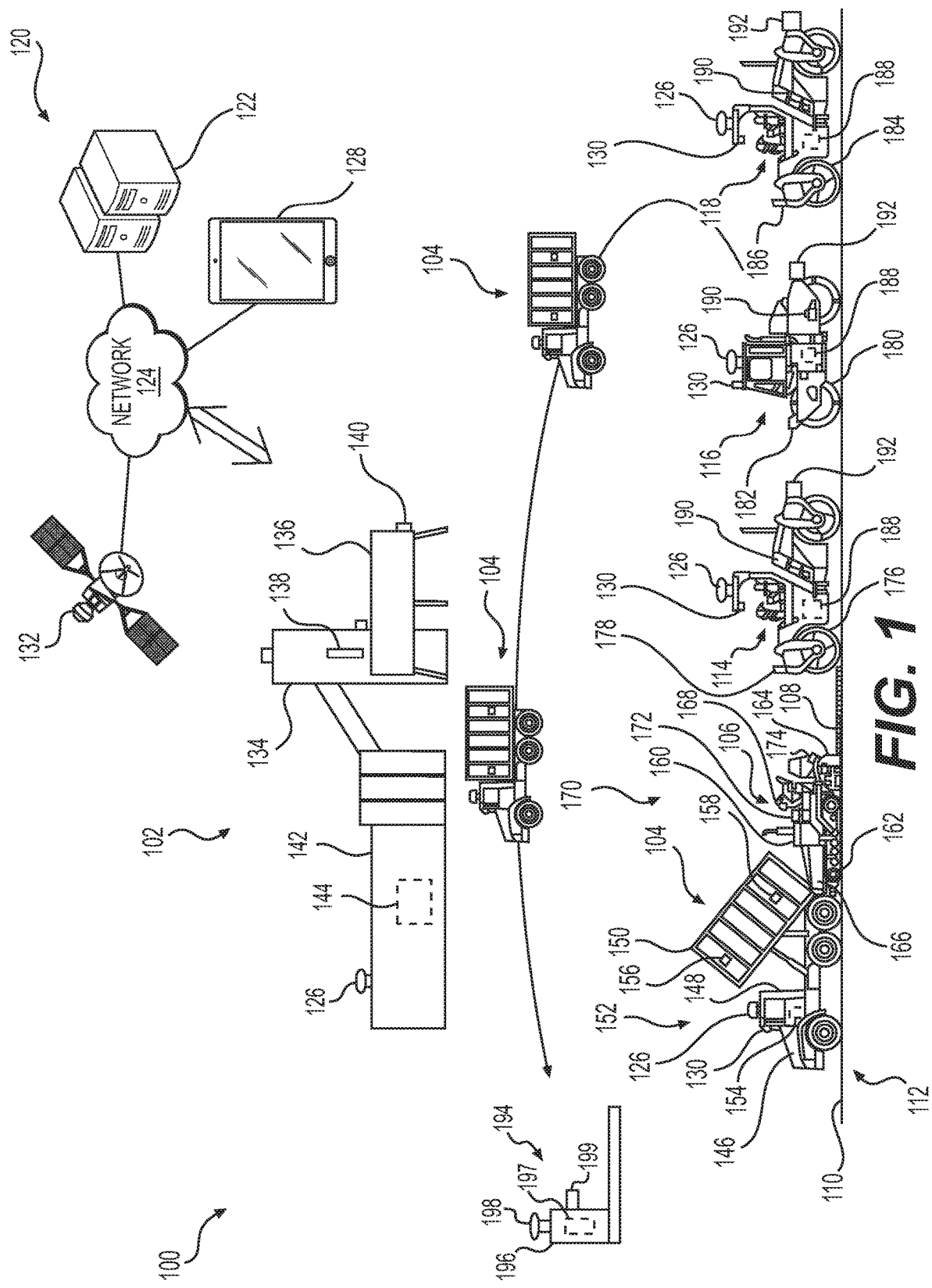
FIG. 1 is a schematic illustration of a paving system having a charging zone in accordance with an example embodiment of the present disclosure.

Wherever possible, the same reference numbers will be used throughout the drawings to refer to the same or like parts. Referring to FIG. 1, an example system may include one or more machines configured to perform paving, construction, farming, mining, or other operations. Such a system may comprise, for example, a paving system 100. As shown in FIG. 1, an example paving system 100 may include one or more paving material plants 102, and a plurality of machines such as one or more haul trucks 104 and/or one or more paving machines 106. For example, the paving material plant 102 may include various equipment configured to heat, produce, sense, store, and/or transfer paving material 108 such as asphalt. For instance, one or more haul trucks 104 may be loaded with a desired amount of paving material 108 at the paving material plant 102. The one or more haul trucks 104 may be configured to travel along various travel paths extending from the paving material plant 102 to, for example, a work surface 110 of a worksite 112, and/or to the worksite 112 generally. Such travel paths may include one or more partially or completely formed roads, highways, bridges, service roads, or other surfaces passable by construction and/or paving machines, and such an example worksite 112 may include, for example, a construction site, a roadworksite, a parking lot, or any other type of job site. Once a haul truck 104 has delivered the paving material 108 to the worksite 112, the haul truck 104 may transfer the paving material 108 to a hopper or other component of the paving machine 106, and the paving machine 106 may apply the paving material 108 to and/or otherwise deposit the paving material 108 on the work surface 110 in the form of a substantially flat, substantially smooth paving material mat. The paving system 100 may also include one or more other machines, such as one or more compaction machines 114, 116, 118, remixing transfer vehicles, wheel loaders, excavators, track-type tractors, motor graders, and/or other construction, mining, paving, or farming machines (not shown). In such examples, the one or more compaction machines 114, 116, 118 may be configured to compact the mat of paving material 108 to a desired density. It is understood that the consistency, density, and/or quality of the mat of paving material may be maximized when the paving machine 106 is controlled to operate at a substantially constant speed, and without stopping. Accordingly, in order to avoid paving machine stoppages, embodiments of the present disclosure may be used to monitor, manage, and/or otherwise control the refueling and/or recharging of the haul trucks 104, the paving machines 106, the compaction machines 14, 116, 118, and/or other components of the paving system 100 on a substantially continuous basis and in substantially real time. Controlling components of the paving system 100 in this way may minimize work stoppage, thereby improving the quality of the mat and the overall efficiency of the paving system 100.

In example embodiments, the paving material plant 102 may produce paving material 108 such as asphalt from bitumen, aggregate, and other materials or fillers. The paving material 108 is often produced in batches with each batch stored or held in a separate storage or holding location, such as a silo, until it is loaded into a haul truck 104 at a loading station. Each holding location may be dedicated to storing or holding paving material 108 for a particular worksite 112 and paving material 108 within a particular holding location is periodically loaded into a haul truck 104 for transport to the worksite 112. The characteristics of each batch stored within a holding location may be set based upon the desired characteristics for a particular paving job. For example, the amount of oil and the size of the aggregate may be set based upon the desired characteristics of the paving material 108 and the requirements of each paving job. It is understood that in additional embodiments, the paving material 108 described herein may also comprise concrete or other such materials.

The paving system 100 shown in FIG. 1 may also include a control system 120 and one or more system controllers 122. In some examples, the control system 120 and/or the system controller 122 may be located at the paving material plant 102. In such examples, the control system 120 and/or the system controller 122 may also include components located remotely from the paving material plant 102 such as on any of the machines of the paving system 100, at the worksite 112, and/or at a remote command center (not shown). In other examples, the control system 120 and/or the system controller 122 may be located remote from the paving material plant 102 and/or remoter from the worksite 112, such as at the remoter command center referred to above. In any of the examples described herein, the functionality of system controller 122 may be distributed so that certain operations are performed at the paving material plant 102 and other operations are performed remotely. For example, some operations of the system controller 122 may be performed at the worksite 112, on one or more of the haul trucks 104, on one or more of the paving machines 106, etc. It is understood that the system controller 122 may comprise a component of the paving system 100, the paving material plant 102, one or more of the haul trucks 104, one or more of the paving machines 106, one or more of the compaction machines 114, 116, 118, a component of a separate mobile device (e.g., a mobile phone, a tablet, a laptop computer, etc.), and/or the control system 120.

The system controller 122 may be an electronic controller that operates in a logical fashion to perform operations, execute control algorithms, store and retrieve data and other desired operations. The system controller 122 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the system controller 122 such as power supply circuitry, signal conditioning circuitry, driver circuitry, and other types of circuitry.

The system controller 122 may be a single controller or may include more than one controller (such as additional controllers associated with each of the haul trucks 104, paving machines 106, compaction machines 114, 116, 118, and/or other machines of the paving system 100) configured to control various functions and/or features of the paving system 100. As used herein, the term "controller" is meant in its broadest sense to include one or more controllers and/or microprocessors that may be associated with the paving system 100, and that may cooperate in controlling various functions and operations of the paving material plant 102 and the machines of the paving system 100. The functionality of the system controller 122 may be implemented in hardware and/or software without regard to the functionality. The system controller 122 may rely on one or more data maps relating to the operating conditions and the operating environment of the paving system 100 that may be stored in the memory of the system controller 122. Each of these data maps may include a collection of data in the form of tables, graphs, and/or equations to maximize the performance and efficiency of the paving system 100 and its operation.

The components of the control system 120 may be in communication with and/or otherwise operably connected to any of the components of the paving system 100 via a network 124. The network 124 may be a local area network ("LAN"), a larger network such as a wide area network ("WAN"), or a collection of networks, such as the Internet. Protocols for network communication, such as TCP/IP, may be used to implement the network 124. Although embodiments are described herein as using a network 124 such as the Internet, other distribution techniques may be implemented that transmit information via memory cards, flash memory, or other portable memory devices.

It is also understood that the paving material plant 102, the various haul trucks 104, paving machines 106, compaction machines 114, 116, 118 and/or other components of the paving system 100 may include respective controllers, and each of the respective controllers may be in communication and/or may otherwise be operably connected via the network 124. For example, the network 124 may comprise a component of a wireless communication system of the paving system 100, and as part of such a wireless communication system, the paving material plant 102, the one or more haul trucks 104, the paving machine 106, the one or more compaction machines 114, 116, 116, and/or other components of the paving system 100 may include respective communication devices 126. Such communication devices 126 may be configured to permit wireless transmission of a plurality of signals, instructions, and/or information between the paving material plant 102, the haul trucks 104, the paving machines 106, the compaction machines 114, 116, 118, and the system controller 122, as well as to permit communication with other machines and systems remote from the paving material plant 102, haul trucks 104, paving machines 106, compaction machines 114, 116, 118, and/or the worksite 112. For example, such communication devices 126 may include a transmitter configured to transmit signals to a receiver of one or more other such communication devices 126. In such examples, each communication device 126 may also include a receiver configured to receive such signals. In some examples, the transmitter and the receiver of a particular communication device 126 may be combined as a transceiver or other such component. In any of the examples described herein, such communication devices 126 may also enable communication with one or more tablets, computers, cellular/wireless telephones, personal digital assistants, mobile devices, or other electronic devices 128 located at the worksite 112, at the paving material plant 102, and/or remote from the worksite 112 or the paving material plant 102. Such electronic devices 128 may comprise, for example, mobile phones and/or tablets of project managers (e.g., foremen) overseeing daily paving operations at the worksite 112 and/or at the paving material plant 102.

The network 124, communication devices 126, and/or other components of the wireless communication system described above may implement or utilize any desired system or protocol including any of a plurality of communications standards. The desired protocols will permit communication between the system controller 122, one or more of the communication devices 126, and/or any other desired machines or components of the paving system 100. Examples of wireless communications systems or protocols that may be used by the paving system 100 described herein include a wireless personal area network such as Bluetooth RTM. (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the control system 120 and a machine (e.g., a paving machine 106, a haul truck 104, etc.) of the paving system 100 or between such machines. In other instances, the communications may be automatically routed without the need for re-transmission by remote personnel.

In example embodiments, one or more machines of the paving system 100 (e.g., the one or more haul trucks 104, the paving machine 106, the one or more compaction machines 114, 116, 118, etc.) may include a location sensor 130 configured to determine a location and/or orientation of the respective machine. In such embodiments, the communication device 126 of the respective machine may be configured to generate and/or transmit signals indicative of such determined locations and/or orientations to, for example, the system controller 122 and/or to the other respective machines of the paving system 100. In some examples, the location sensors 130 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein may comprise a GPS receiver, transmitter, transceiver, laser prisms, and/or other such device, and the location sensor 130 may be in communication with one or more GPS satellites 132 and/or UTS to determine a respective location of the machine to which the location sensor 130 is connected continuously, substantially continuously, or at various time intervals. One or more additional machines of the paving system 100 may also be in communication with the one or more GPS satellites 132 and/or UTS, and such GPS satellites 132 and/or UTS may also be configured to determine respective locations of such additional machines. In any of the examples described herein, machine locations determined by the respective location sensors 130 may be used by the system controller 122 and/or other components of the paving system 100 to coordinate activities of the haul trucks 104, paving machine 106, compaction machines 114, 116, 118, and/or other components of the paving system 100. For example, machine locations determined by the respective location sensors 130 may be used by the system controller 122 and/or other components of the paving system 100 to determine travel paths, return paths, progress (e.g., a completion percentage) associated with a worksite plan, a return power required for one or more machines of the paving system 100 to traverse a return path, and/or other parameters described herein. Such parameters may be useful in minimizing and/or avoiding work stoppages caused by, for example, refueling and/or recharging of one or more machines of the paving system 100.

With continued reference to FIG. 1, the paving material plant 102 may include various material delivery components, mixers, heaters, and/or other equipment configured to assist in manufacturing paving material 108 for use in various paving operations. Such equipment may include, for example, one or more conveyors or other devices configured to transport paving material 108 to one or more paving material silos 134 or other holding locations for storage therein. The paving material plant 102 may also include one or more load stations 136 configured to transfer paving material 108 from the one or more paving material silos 134 to a haul truck 104. In such examples, a paving material silo 134 may include one or more sensors 138 configured to determine a temperature of paving material 108 stored within the paving material silo 134 and/or an amount of paving material 108 stored within the paving material silo 134 (e.g., a fill level of the paving material silo 134). Similarly, a load station 136 may include one or more sensors 140 configured to determine the presence and/or location of a haul truck 104, a time at which the haul truck 104 arrived at the load station 136, a time at which the haul truck 104 departed the load station 136, an amount (e.g., a weight) of paving material 108 loaded into the haul truck 104, and/or other operating parameters. In some examples, the sensor 140 may comprise a scale or other mass sensor configured to determine the weight of the haul truck 104 upon entering the load station 136, the weight of the haul truck 104 after paving material has been loaded into the haul truck 104, and/or a change in weight of the haul truck 104.

The paving material plant 102 may also include one or more scale houses, operator stations, or other stations 142 for use by paving material plant personnel. For example, as shown in phantom in FIG. 1, one or more such stations 142 may include a paving material plant controller 144 that is substantially similar to and/or the same as the system controller 122 described above. In some examples, the paving material plant controller 144 may comprise a component of the control system 120. In any of the examples described herein, the paving material plant controller 144 and/or other components of the paving material plant 102 may be configured to monitor, record, and/or communicate activities of the various haul trucks 104 entering and leaving the paving material plant 102.

As noted above, the haul trucks 104 of the paving system 100 may be operative to transport paving material 108 between the paving material plant 102 and one or more of the paving machines 106 located at the worksite 112. Each haul truck 104 may include a chassis 146 that supports a prime mover, such as an engine, and a cab 148 in which an operator may be positioned to provide input instructions to operate the haul truck 104. The engine is operatively connected to and drives a ground engaging drive mechanism such as wheels. A material transport unit such as a dump body 150 is pivotally mounted on the chassis 146 and receives a payload (e.g., paving material 108) to be hauled from one location to another.

Each haul truck 104 may include a truck control system 152 and a truck controller 154 generally similar or identical to the control system 120 and the system controller 122, respectively. The truck control system 152 and the truck controller 154 may be located on the haul truck 104 and may also include components located remotely from the haul truck 104 such as on any of the other machines of the paving system 100, at the paving material plant 102, or at a command center (not shown). For example, the truck controller 154 may include one or more processors, one or more hard drives, memory, or other storage devices, and/or other components. The functionality of truck controller 154 may be distributed so that certain functions are performed on the haul truck 104 and other functions are performed remotely. In some examples, the truck control system 152 and/or the truck controller 154 may enable autonomous and/or semi-autonomous control of the haul truck 104. As used herein, an "autonomous" machine of the paving system 100 may comprise a machine (e.g., a haul truck 104, a paving machine 106, a compaction machine 114, 116, 118, etc.) configured to traverse a travel path and/or perform various tasks or operations (e.g., lifting, dumping, paving, compacting paving material, etc.) without operator control or input. In such examples, the system controller 122 and/or a respective controller of the autonomous machine may substantially completely control such machine operations based on instructions, stored logic/programs, learning algorithms, or other components. As used herein, a "semi-autonomous" machine of the paving system 100 may comprise a machine configured to traverse a travel path and/or perform various tasks or operations upon receiving input and/or approval from an operator. In such examples, the system controller 122 and/or a respective controller of the semi-autonomous machine may substantially completely control such machine operations based on instructions, stored logic/programs, learning algorithms, or other components in combination with receipt of one or more inputs from an operator.

The haul truck 104 may also be equipped with a plurality sensors connected to and/or otherwise in communication with the truck controller 154 and/or with the system controller 122. Such sensors may be configured to provide data indicative (directly or indirectly) of various operating parameters of the haul truck 104, systems associated with the haul truck 104, and/or the worksite 112 and/or other environment in which the haul truck 104 is operating. In any of the examples described herein, such sensors may comprise components of the truck control system 152, the control system 120, and/or the paving system 100, generally. For example, as noted above, the haul truck 104 may be equipped with a location sensor 130 configured to sense, detect, and/or otherwise determine a location and/or orientation of the haul truck 104. The location sensor 138 may include a plurality of individual sensors that cooperate to generate and provide location signals to the truck controller 154 and/or to the system controller 122 indicative of the location and/or orientation of the haul truck 104. In some examples, the location sensor 130 may be fixed to the cab 148, the chassis 146, and/or any other component of the haul truck 104. In other examples, however, the location sensor 130 may be removably attached to the haul truck 104 and/or disposed within, for example, the cab 148 of the haul truck 104 during operation of the haul truck 104. In some examples, the haul truck 104 may also include a load sensor 156 configured to sense, measure, and/or otherwise determine the load or amount of paving material 108 disposed within the dump body 150. The haul truck 104 may further include a temperature sensor 158 configured to sense, measure, and/or otherwise determine the temperature of the load (e.g., paving material 108) within the dump body 150.

The paving machine 106 may include a frame 160 having a set of ground engaging wheels or tracks 162 mounted thereto, as well as a screed 164 for spreading paving material 108 across a width of the work surface 110. The paving machine 106 may further include a hopper 166 for storing paving material 108 supplied by the haul truck 104 or another supply machine, and a conveyor system which transfers paving material 108 from the hopper 166 to the screed 164. The paving machine 106 may further include a display 168, such as an LCD display. The display 168 may be mounted to the frame 160 for viewing by an operator. In an example embodiment, the display 168 may be configured to display a map of the worksite 112 including icons or other visual indicia representing the work surface 110, the paving machine 106, the haul truck 104, one or more of the compaction machines 114, 116, 118, and/or other components of the paving system 100.

The paving machine 106 may also include a paving machine control system 170 and a paving machine controller 172 generally similar or identical to the control system 120 and the system controller 122, respectively. The paving machine control system 170 and the paving machine controller 172 may be located on the paving machine 106 and may also include components located remotely from the paving machine 106 such as on any of the other machines of the paving system 100, at the paving material plant 102, or at a command center (not shown). For example, the paving machine controller 172 may include one or more processors, one or more hard drives, memory, or other storage devices, and/or other components. The functionality of paving machine controller 172 may be distributed so that certain functions are performed on the paving machine 106 and other functions are performed remotely. In some examples, the paving machine control system 170 and/or the paving machine controller 172 may enable autonomous and/or semi-autonomous control of the paving machine 106.

The paving machine 106 may also be equipped with a plurality sensors connected to and/or otherwise in communication with the paving machine controller 172 and/or with the system controller 122. Such sensors may be configured to provide data indicative (directly or indirectly) of various operating parameters of the paving machine 106, systems associated with the paving machine 106, and/or the worksite 112, and/or other environments in which the paving machine 106 is operating. In any of the examples described herein, such sensors may comprise components of the paving machine control system 170, the control system 120, and/or the paving system 100, generally. For example, in addition to the location sensor 130 and communication device 126 described above, the paving machine 106 may also include a temperature sensor 174 mounted, for example, on or proximate the screed 164. The temperature sensor 174 may be positioned and/or otherwise configured to determine the temperature of the mat of paving material 108 deposited on the work surface 110 by the screed 164.

As noted above, the paving system 100 may include one or more compaction machines 114, 116, 118 configured to compact the mat of paving material 108 deposited by the paving machine 106. In some examples, the compaction machine 114 may comprise a "breakdown" compactor having a breakdown drum 176, and the compaction machine 114 may be configured to follow relatively closely behind the paving machine 106, such that the breakdown drum 176 can compact paving material 108 distributed by the paving machine 106 while the paving material 108 is still relatively hot. Compacting with the compaction machine 114 when the paving material 108 is still relatively hot allows the breakdown drum 176 of the compaction machine 114 to perform a relatively large proportion of the total compaction desired for a particular lift of paving material 108, as relatively hotter asphalt in the paving material 108 can flow relatively readily and is thus readily compacted.

In addition to the communication device 126 and the location sensor 130 described above, the compaction machine 114 may further include any number of additional sensors configured to assist the compaction machine 114 in performing various paving (e.g., compaction) tasks. For example, such sensors may include one or more accelerometers or vibration sensors configured to sense the level of vibration (e.g., impacts per foot) imparted by the breakdown drum 176. The compaction machine 114 may also include a temperature sensor 178 mounted thereon and configured to sense, measure, and/or otherwise determine a temperature of the paving material 108 with which the compaction machine 114 is interacting or with which it has interacted. In some examples, the temperature sensor 178 may be substantially similar to and/or the same as the temperature sensor 174 of the paving machine 106.

The compaction machine 116 may be substantially similar to and/or the same as the compaction machine 114. In some examples, the compaction machine 116 may comprise an "intermediate" compactor, and may include an intermediate drum 180 which compacts paving material 108 already compacted at least once by the compaction machine 114. The compaction machine 116 may include a sensor or other device configured to sense a smoothness and/or stiffness of the paving material 108. Additionally, the compaction machine 116 may include the communication device 126 and the location sensor 130 described above, as well as any number of additional sensors configured to assist the compaction machine 116 in performing various paving (e.g., compaction) tasks. For example, such sensors may include one or more accelerometers or vibration sensors configured to sense the level of vibration (e.g., impacts per foot) imparted by the intermediate drum 180. The compaction machine 116 may also include a temperature sensor 182 mounted thereon and configured to sense, measure, and/or otherwise determine a temperature of the paving material 108 with which the compaction machine 116 is interacting or with which it has interacted. In some examples, the temperature sensor 182 may be substantially similar to and/or the same as the temperature sensor 174 of the paving machine 106.

The compaction machine 118 may also be substantially similar to and/or the same as the compaction machine 114. In some examples, the compaction machine 118 may comprise a "finishing" compactor, and may include a finish drum 184 configured to perform a final squeeze of the paving material 108. In such examples, the compaction machine 118 may be configured to follow relatively closely behind compaction machine 116. In some instances, it will be desirable to compact paving material 108 with the compaction machine 118 prior to its cooling below a temperature in the range of about 50 degrees Celsius to about 65 degrees Celsius. To this end, the compaction machine 118 may also include a temperature sensor 186 to verify whether the final compaction is taking place at an appropriate paving material temperature. As noted above with respect to the compaction machines 114, 116, the compaction machine 118 may also include a communication device 126 and a location sensor 130, as well as any number of additional sensors configured to assist the compaction machine 118 in performing various paving (e.g., compaction) tasks. For example, such sensors may include one or more accelerometers or vibration sensors.

As noted above, one or more machines of the paving system 100 may include respective controllers configured to control various operations of the machine. Such controllers may be utilized, for example, to assist in controlling the autonomous and/or semi-autonomous machines of the paving system 100 described herein. For example, one or more of the compaction machines 114, 116, 118 may include a respective controller 188, and the controller 188 may be substantially similar to and/or the same as the truck controller 154 and/or the paving machine controller 172 described above. For example, the controller 188 may comprise a compaction machine controller, and the controller 188 may be located on the one or more compaction machines 114, 116, 118. The controller 188 may also include components located remotely from the one or more of the compaction machines 114, 116, 118, such as on any of the other machines of the paving system 100, at the paving material plant 102, or at a command center (not shown). For example, the controller 188 may include one or more processors, one or more hard drives, memory, or other storage devices, and/or other components. The functionality of the controller 188 may be distributed so that certain functions are performed on the one or more of the compaction machines 114, 116, 118, and other functions are performed remotely. In some examples, the controller 188 may enable autonomous and/or semi-autonomous control of the respective compaction machine 114, 116, 118 to which it is operably connected.

Further, each machine of the paving system 100 may be powered by one or more diesel engines, gasoline engines, compressed natural gas engines, electric motors, fuel cells, or other prime movers. In any such examples, the prime mover of the respective machine may require periodic refueling and/or recharging for continued operation. Accordingly, each machine of the paving system 100 described herein may include one or more energy storage devices 190 configured to store energy or other materials consumable by the prime mover of the respective machine to generate power. In some examples, such as examples in which the prime mover of the machine comprises a diesel engine, a gasoline engine, a compressed natural gas engine, or other such component, the energy storage device 190 may comprise one or more fuel tanks configured to store diesel fuel, gasoline, compressed natural gas, or other such materials. In examples in which the prime mover comprises an electric motor, the energy storage device 190 may comprise one or more rechargeable batteries configured to store electronic charge and to controllably provide electrical current to the electric motor. In examples in which the prime mover comprises a fuel cell, the energy storage device 190 may comprise one or more hydrogen tanks configured to store compressed hydrogen. It is understood that in additional example embodiments, other energy storage devices 190 may be used. For ease of description, and unless otherwise specified, the energy storage devices 190 discussed herein will be described as rechargeable batteries unless otherwise specified. In such examples, the respective prime movers (e.g., the prime movers of the compaction machines 114, 116, 118) may comprise electric motors. In any such examples, one or more of the compaction machines 114, 116, 118 may comprise manually operated machines, autonomous machines, or semi-autonomous machines.

One or more machines of the paving system 100 may also include a coupling device 192 operably connected to the energy storage device 190 of the respective machine. In such examples, the coupling device 192 may be configured to receive energy or other materials consumable by the prime mover of the respective machine to generate power. For instance, in examples in which the prime mover comprises a diesel engine, the coupling device 192 may comprise a fluid valve, a nozzle, a hose, and/or other fluid coupling having a substantially fluid-tight seal and configured to receive a flow of diesel fuel. In such examples, the coupling device 192 may be configured to direct a received flow of diesel fuel to the fuel tank or other energy storage device 190 of the machine. Alternatively, in examples in which the prime mover comprises an electric motor, the coupling device 192 may comprise one or more magnetic and/or conductive lugs, terminals, receptacles or other components configured to receive electrical current at a desired voltage or over a range of voltages. In such examples, the coupling device 192 may be configured to direct the received current to the rechargeable batteries or other energy storage device 190 of the machine.

As shown in FIG. 1, the paving system 100 may also include one or more charging zones 194, and each charging zone 194 may include one or more charging stations 196. In such examples, a charging zone 194 may comprise an area, portion, or section of the worksite 112, and such charging zones 194 may have one or more fences, gates, or other boundaries defining at least part of a perimeter of the charging zone 194. One or more of the charging stations 196 may be disposed at least partly within each charging zone 194. Such charging stations 196 may be configured to direct a supply of fuel, electrical current, compressed hydrogen, compressed natural gas, and/or other materials or energy to a machine of the paving system 100. In such examples, the charging stations 196 may include a supply of such materials or energy. The charging stations 196 may also include one or more coupling devices 199 configured to mate with the coupling device 192 of the machine. Such coupling devices 199 may comprise one or more fluid valves, nozzles, hoses, and/or other fluid couplings configured to deliver a flow of fluid. In other examples, the coupling devices 199 may comprise one or more magnetic and/or conductive lugs, terminals, receptacles or other components configured to provide electrical current at a desired voltage or over a range of voltages.

Each charging station 196 may also include a controller 197 and a communication device 198. In such examples, the controller 197 may be substantially similar to and/or the same as the controller system 122, and the communication deice 198 may be substantially similar to and/or the same as the communication device 126. The charging station 196 may, thus, be configured to receive instructions from the system controller 122 (via the communication device 198), and the controller 197 of the charging station 196 may be configured to cause the charging station 196 to provide a flow of fluid or electrical current to a machine of the paving system 100 upon execution of such instructions. In some embodiments, the charging station 196 may also include one or more motors or other actuators operably connected to the controller 197. For example, such actuators may be connected to a moveable arm, shaft, rod, or other moveable structure, and the coupling device 199 may be connected to the moveable structure such that the coupling device 199 is moveable relative to a stationary housing of the charging station 196. In such embodiments, the actuator may move, orient, and/or otherwise position the coupling device 199 so as to mate the coupling device 199 with a corresponding coupling device 192 of a machine present at the charging station 196. Additionally, in some embodiments the charging station 196 may include one or more sensors or other devices in communication with the controller and configured to detect a faulty connection between the coupling device 199 of the charging station 196 and a corresponding coupling device 192 of the machine present at the charging station 196. For example, such a sensor may comprise a flow sensor or other like sensor configured to sense, detect, and/or otherwise determine a fluid leak when the coupling device 199 of the charging station 196 is coupled to the coupling device 192. Additionally or alternatively, such a sensor may comprise a ground fault sensor or other sensor configured to detect a grounding issue, an open circuit, or other faulty electrical connection. In any of the examples herein, such sensors may be configured to send a signal to the controller 197 upon detecting such a faulty connection. The controller 197 may be configured to, for example, cause the charging station 196 to stop the flow of liquid fuel and/or stop the flow electrical current in response to such a signal. The controller 197 may also be configured to provide an alert or other message to the controller 122, one or more electronic devices 128, and/or one or more machines of the paving system 100 in response to such a signal.

Figure 2:
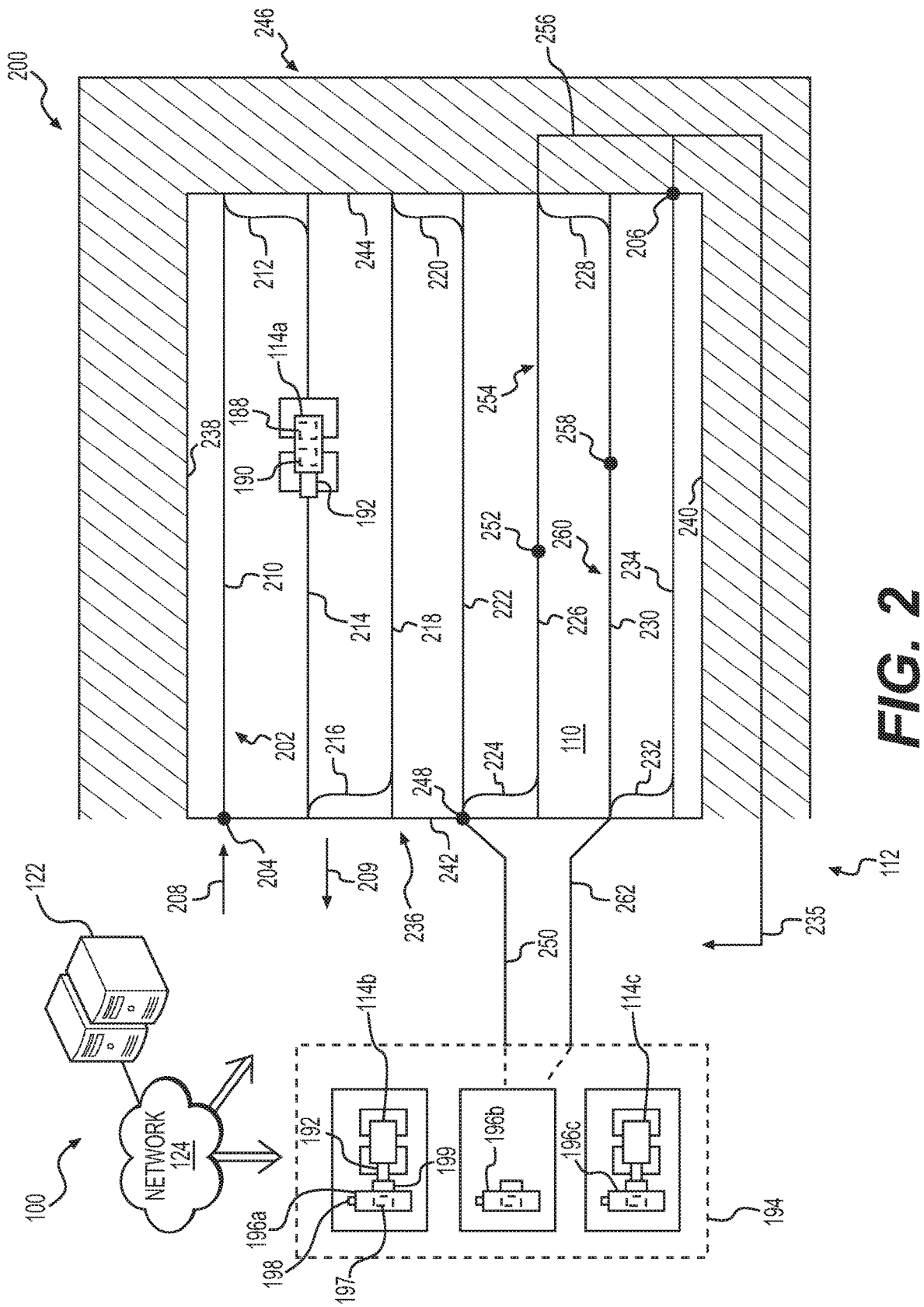
FIG. 2 is a schematic illustration of a worksite at which one or more machines of the paving system shown in FIG. 1 may be utilized.

FIG. 2 is an example schematic diagram illustrating various components of the paving system 100 in further detail. For example, FIG. 2 provides a visual illustration of an example worksite plan 200. Such a visual illustration of the worksite plan 200 may include one or more lines, dots, arrows, shapes, and/or other visual indicia that correspond to and/or indicate a travel path 202 of a particular machine (e.g., a compaction machine 114*a*, 114*b*, 114*c*, etc.) of the paving system 100, a start location 204 of the travel path 202, an end location 206 of the travel path 202, one or more arrows 208, 209 indicating respective directions of travel along the travel path 202, as well as other information. An example visual illustration of the worksite plan 200 may also include one or more lines, dots, arrows, shapes, and/or other visual indicia that correspond to and/or indicate acceleration, deceleration, and various segments, passes, turns, or other maneuvers to be made by the particular machine (e.g., the compaction machine 114*a* shown in FIG. 2) of the paving system 100 as the machine traverses the travel path 202.

For example, as shown in FIG. 2 an example travel path 202 may include one or more segments defined by the work surface 110. In some examples, the travel path 202 may include a plurality of sequential segments extending along the work surface 110. In particular, the example travel path 202 shown in FIG. 2 includes a first segment 210, a first turn 212, a second segment 214, a second turn 216, a third segment 318, a third turn 220, a fourth segment 222, a fourth turn 224, a fifth segment 226, a fifth turn 228, a sixth segment 230, a sixth turn 232, and a seventh segment 234. In some examples, and depending upon the shape, size, and/or other configuration of the work surface 110, one or more of the segments included in the travel path 202 may be substantially parallel to one another. Also, it is understood that any of the example travel paths 202 described herein may include greater than or less than the number of segments, turns, and/or other components of the travel path 202 illustrated in FIG. 2. Additionally, the compaction machine 114*a* may travel in forward and/or reverse directions along any of the segments (e.g., segments 210, 214, 218, 222, 226, 230, 234) and/or turns included in the travel path 202. Further, any of the turns (e.g., turns 212, 216, 220, 224, 228, 232) included in the travel path 202 may be "K" turns, "S" turns, and/or any other type of turning maneuver. As shown in FIG. 2, for example, the compaction machine 114*a* may travel from left to right (i.e., in the direction of arrow 208) along segment 210, and may reverse direction to travel along the turn 212. The compaction machine 114*a* may then travel in the direction of arrow 208 to a perimeter 236 of the work surface 110. For instance, the perimeter 236 may comprise a plurality of boundaries 238, 240, 242, 244, and the compaction machine 114*a* may travel along the segment 214 in the direction of arrow 208 to the boundary 244. Upon reaching the boundary 244, the compaction machine 114*a* may travel, in the direction of arrow 209, along the segment 214 until reaching the boundary 242 and/or making the turn 216. A similar process may be repeated for any of the turns (e.g., turns 216, 220, 224, 228, 232) included in the travel path 202. Moreover, in any of the examples described herein, the compaction machine 114*a* may be controlled to remain within the perimeter 236. For example, the travel path 202 may prohibit the compaction machine 114*a* from crossing and/or exiting the perimeter 236. Alternatively, the worksite 112 may include a maneuver zone 246 substantially surrounding at least part (or in some examples, all) of the perimeter 236. The maneuver zone 246 may comprise an area of the worksite 112 configured for machine travel, and in such embodiments, the compaction machine 114*a* may make one or more turns (e.g., turns 212, 216, 220, 224, 228, 232) or other maneuvers within the maneuver zone 246. In such examples, the maneuver zone 246 may define at least part of the travel path 202.

In any of the examples described herein, the controller 122 may determine the travel path 202 and/or other components of the worksite plan 200 in a number of ways. For instance, the controller 112 may receive (e.g., from an operator, foreman, or other individual associated with the paving system 100) information indicative of a paving plan that outlines compaction requirements or specifications associated with the paving material 108 being deposited on the work surface 110. Such compaction requirements may specify that the compaction machine 114*a* is required to travel along the travel path 202 (e.g., from the start location 204 to the end location 204) a predetermined number of times, (e.g., 2 times, 3 times, 4 times, etc.). Additionally or alternatively, such compaction requirements may require that the paving material 108 be compacted to a minimum density or stiffness. In such examples, the controller 112 may generate the worksite plan 200 based at least in part on the received paving plan. As will be described below, the system controller 122 may also receive information indicative of the perimeter 236, the location of the charging zone 194, and/or other information, and in such examples, the system controller 122 may generate the worksite plan 200 based at least in part on such additional information.

With continued reference to FIG. 2, and as noted above, one or more of the charging stations described herein (e.g., charging stations 196*a*, 196*b*, 196*c*, etc.) may be configured to refuel and/or recharge various machines (e.g., compaction machines 114*a*, 114*b*, 114*c*, etc.) of the paving system 100, as needed, to maintain substantially continuous coordinated operation of such machines at the worksite 112 and to maximize efficiency. In such examples, the system controller 122 and/or the controller of the respective machine (e.g., the controller 188 of the compaction machine 114*a*) may be configured to determine one or more return paths extending from a current location of the machine to the charging zone 194. With respect to the compaction machine 114*a* shown in FIG. 2, in some examples the system controller 122 and/or the controller 188 may make such a determination when the compaction machine 114*a* reaches the start location 204. In such examples, upon reaching the start location 204 the system controller 122 may determine whether the battery or other storage device 190 of the compaction machine 114*a* has a sufficient amount of available power stored therein to traverse the entire travel path 202 and to return to the charging zone 194 after reaching the end location 206. In such examples, if the system controller 122 determines that the storage device 190 of the compaction machine 114a does have a sufficient amount of available power stored therein to traverse the entire travel path 202, the system controller 122 may cause the compaction machine 114a to traverse the travel path 202 in accordance with the worksite plan 202 without the need for periodic recharging. On the other hand, if the system controller 122 determines that the storage device 190 of the compaction machine 114a does not have a sufficient amount of available power stored therein to traverse the entire travel path 202, the system controller 122 may, in some embodiments, reconfigured the worksite plan 200 to incorporate a shorter travel path 202 such that the compaction machine 114a may traverse the shorter travel path 202 without the need for periodic recharging. Alternatively, in such examples, if the system controller 122 determines that the storage device 190 does not currently have a sufficient amount of available power stored therein to traverse the entire travel path 202, but that the storage device 190 would have sufficient available power stored therein at full charge, the system controller 122 may cause the compaction machine 114a to return to the charging zone 194 in order to fully charge the energy storage device 190. Any of the example scenarios noted above may assist in maintaining substantially continuous operation of the compaction machine 114a once it begins traversing the travel path 202.

In further examples, the travel path 202 and/or other aspects of the worksite plan 200 may be of a length, size, or scale such that even a fully charged energy storage device 190 may not have the capacity to store enough energy to power the compaction machine for the entire travel path 202 without refueling/recharging. In such examples and while the compaction machine 114a is traversing the travel path 202, upon reaching a portion of the perimeter 236 disposed closest to the charging zone 194 (e.g., the boundary 242) and/or otherwise adjacent to one or more turns (e.g., turns 216, 224, 232) of the travel path 202, the system controller 122 may determine whether the energy storage device 190 of the compaction machine 114a has a sufficient amount of available power stored therein to traverse the next two sequential segments of the travel path 202. For example, and for purposes of discussion, when the compaction machine 114a, traveling in the direction of arrow 209 along the segment 222, reaches a location 248 adjacent the perimeter 236 and at the end of segment 222, the system controller 122 may determine whether the amount of available power stored in the energy storage device 190 is greater than or equal to a total amount of power required to traverse the segment 226 in the direction of arrow 208, the turn 228, the segment 230 in the direction of arrow 209, and a return path 262 extending from an end of the segment 230 to the charging zone 194. The system controller 122 may determine such a total amount of power based on, for example, the total distance of the segments 226, 230, the turn 228, and the return path 262, and a known amount of power required by the compaction machine 114a to traverse a set distance (e.g., Kw/mile). Such a known amount of power may comprise, for example, a running average based on recent operation of the compaction machine 114a, an estimated power requirement of the machine, etc. If the amount of available power stored in the energy storage device 190 is greater than or equal to such a total amount of power, the system controller 122 may cause the compaction machine 114a to traverse the segment 226, the turn 228, and the segment 230. If the amount of available power stored in the energy storage device 190 is less than the such a total amount of power, the system controller 122 may cause the compaction machine 114a to traverse a return path 250 extending from the location 248 to the charging station 194.

In additional embodiments, the system controller 122 may make similar determinations based on one or more current locations of the compaction machine 114a, at regular time intervals, and/or other control strategies. For example, the system controller 122 may monitor the amount of available power stored in the energy storage device 190 in substantially real time and/or substantially continuously. For instance, and for and for purposes of discussion, when the compaction machine 114a, traveling in the direction of arrow 208 along the segment 226, reaches a location 252, the system controller 122 may determine whether the amount of available power stored in the energy storage device 190 is greater than or equal to a total amount of power required to traverse a return path 254 extending from the current location 252 of the compaction machine 114a. In such examples, the return path 254 may comprise a remainder of the segment 226, a segment 256 extending substantially parallel to the boundary 244 within the maneuver zone 246, and a segment 235 extending from the segment 256 to the charging zone 194. If the amount of available power stored in the energy storage device 190 is greater than or equal to such a total amount of power, the system controller 122 may cause the compaction machine 114a to continue traversing the travel path 200 (e.g., the segment 226, the turn 228, the segment 230, etc.) in accordance with and/or based on the worksite plan 200. If the amount of available power stored in the energy storage device 190 is less than the such a total amount of power, the system controller 122 may cause the compaction machine 114a to traverse the return path 254 extending from the location 252 to the charging station 194.

As a further example, and for and for purposes of discussion, when the compaction machine 114a, traveling in the direction of arrow 209 along the segment 230, reaches a location 258, the system controller 122 may determine whether the amount of available power stored in the energy storage device 190 is greater than or equal to a total amount of power required to traverse a return path 260 extending from the current location 258 of the compaction machine 114a. In such examples, the return path 260 may comprise a remainder of the segment 230, and the return path 262 (described above) extending from the segment 230 to the charging zone 194. If the amount of available power stored in the energy storage device 190 is greater than or equal to such a total amount of power, the system controller 122 may cause the compaction machine 114a to continue traversing the travel path 200 (e.g., the segment 230, the turn 232, the segment 234, etc.) in accordance with and/or based on the worksite plan 200. If the amount of available power stored in the energy storage device 190 is less than the such a total amount of power, the system controller 122 may cause the compaction machine 114a to traverse the return path 260 extending from the location 258 to the charging station 194. In any of the embodiments described herein, the system controller 122 may also cause one or more additional compaction machines (e.g., compaction machines 114b, 114c) disposed within the charging zone 194, and having sufficient available power stored in the respective energy storage devices 190 of such machines, to dispatch from the charging zone 194 based at least in part on causing the compaction machine 114a to traverse a selected return path. In this way, the system controller 122 may cause compaction activities at the worksite 112 to continue substantially uninterrupted even when a compaction machine 114a is in need of recharging/refueling. Such control strategies may minimize work stoppages and may optimize the efficiency of the paving system 100.

Figure 3:
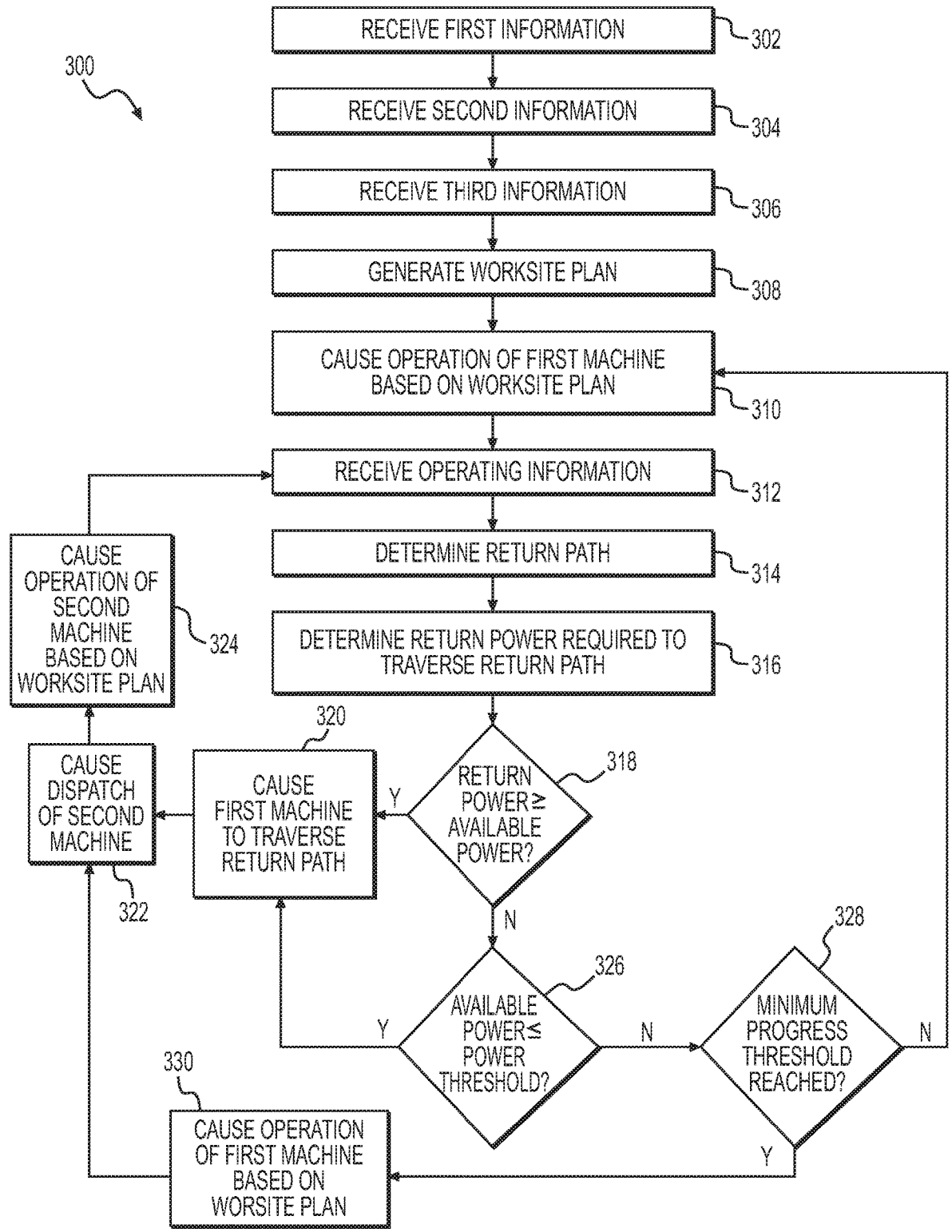
FIG. 3 is a flow chart depicting an example method associated with the paving system shown in FIG. 1.

FIG. 3 illustrates a flow chart depicting an example method 300 associated with the paving system 100. In particular, the flow chart of FIG. 3 illustrates an example method of coordinating the activities of multiple machines associated with the paving system 100 described above in order to recharge and/or refuel such machines while minimizing and/or substantially eliminating work stoppages. The example method 300 is illustrated as a collection of steps in a logical flow diagram, which represents operations that can be implemented in hardware, software, or a combination thereof. In the context of software, the steps represent computer-executable instructions stored in memory. When such instructions are executed by, for example, the controller 122, such instructions may cause the controller 122, various components of the control system 120, the paving material plant controller 144, the truck controller 154, the paving machine controller 172, the controller 188, the controller 197, and/or other components of the paving system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 300 is described with reference to the paving system 100, the control system 120, the paving material plant 102, and/or other items shown in FIGS. 1 and 2. In particular, although any part of and/or the entire method 300 may be performed by the truck controller 154, the paving machine controller 172, the paving material plant controller 144, the electronic device 128, the controller 188, and/or other components of the paving system 100, unless otherwise specified, the method 300 will be described below with respect to the system controller 122 for ease of description.

With reference to FIG. 3, at 302 the system controller 122 may receive first information associated with and/or indicative of the paving plan corresponding to the worksite 112. In such examples, the paving plan may include information indicating the depth of a cut area formed by the work surface 110, the width of the cut area, and the desired stiffness and/or density of the mat of paving material 108 to be deposited within the cut area (e.g., on the work surface 110). The paving plan may further include the type of paving material 108 (e.g., the composition of the paving material 108) to be deposited on the work surface 110, as well as a required number of compaction machine passes, a desired number of impacts per foot associated with one or more of the compaction machines 114, 116, and/or any other parameters governing the finished mat of paving material 108 to be produced by the paving system 100. In such examples, at 302 the system controller 122 may receive the first information, in electronic form, from a foreman at the worksite 112, from an operator or other employee of the paving material plant 102, or from any other source. For example, at 302 a foreman or other operator of the paving system 100 may manually or electronically enter the paving plan or other such information using a keyboard, touch screen, or other operator interface of the system controller 122 and/or of the electronic device 128. It is understood that the paving plan and/or other information received at 302 may be applicable for a predetermined time period (e.g., an eight-hour shift, a one-hour shift, etc.).

At 304, the system controller 122 may receive second information indicative of the perimeter 236. As noted above, the perimeter 236 may comprise a perimeter of the work surface 110, and in some examples, the perimeter 236 may comprise a perimeter of the worksite 112. For instance, in some examples the second information received at 304 may comprise a map of the worksite 112 that includes and/or otherwise identifies the various boundaries 238, 240, 242, 244 defining the perimeter 236 of the work surface 110 and/or other areas of the work site 112 In particular, such a paving plan may include information (e.g., GPS coordinates or other local/global positioning information) indicating the location, extent, and/or other configurations of the boundaries 238, 240, 242, 244 defining the perimeter 236. The second information received at 304 may further include information (e.g., GPS coordinates or other local/global positioning information) indicating the location of the charging zone 194 and/or of the one or more charging stations 196a, 196b, 196c located in the charging zone 194.

At 306, the system controller 122 may receive third information. Such third information may indicate, for example, the quantity of haul trucks 104 assigned to the worksite 112, the size and/or capacity of the respective haul trucks 104, the quantity and type of compaction machines 114, 116, 118 assigned to the worksite 112, the quantity of paving machines 106 assigned to the worksite 112, the expected paving material production rate of the paving material plant 102 and corresponding to the worksite 112, the distance from the paving material plant 102 to the worksite 112, the expected elapsed time it will take a haul truck 104 to travel from the paving material plant 102 to the worksite 112, and/or other like information. In some examples, the third information received at 306 may also include the quantity, type, and/or identity of one or more compaction machines (e.g., compaction machines 114b, 114c) currently disposed at respective charging stations 196a, 196c of the charging zone 194. Similar to the first information described above with respect to 302, at 304 and 306 the system controller 122 may receive such second and third information, in electronic form, from a foreman at the worksite 112, from an operator or other employee of the paving material plant 102, or from any other source. For example, at 304 and 306 a foreman or other operator of the paving system 100 may manually or electronically enter the first and second information noted above, using a keyboard, touch screen, or other operator interface of the system controller 122 and/or of the electronic device 128.

At 308, the system controller 122 may generate a worksite plan 200 based at least in part on the first information, the second information, and/or the third information. For instance, as described above with respect to FIG. 2, an example worksite plan 200 may include a travel path 202 for the compaction machine 114a that is substantially within the perimeter 236 of the work surface 110. The worksite plan 200 generated by the system controller 122 at 308, and in particular, the travel path 202 of the worksite plan 200, may be configured to optimize the compaction activities and/or other activities being performed one or more machines of the paving system 100 at the worksite 112. For example, the travel path 202 may be arranged and/or otherwise configured to minimize the work and/or time required of the compaction machine 114a to compact paving material 108 deposited on the work surface 110. Such a worksite plan 200 may also include a speed of the compaction machine 114a, a vibration frequency and/or a vibration amplitude of one or both drums of the compaction machine 114a (e.g., the breakdown drum 176, the intermediate drum 180, the finish drum 184, etc.), steering instructions for autonomous/semi-autonomous control of the compaction machine 114a, braking instructions for autonomous/semi-autonomous control of the compaction machine 114a, and/or other operating parameters of the compaction machine 114a. Additionally, such a worksite plan 200 may include an estimated time required to complete the corresponding compaction operation, an estimated maximum coverage amount/percentage, a maximum amount of acceptable overlap between sequential segments of the travel path 202, and/or other values or metrics associated with the compaction operation. Any of the values, metrics, parameters or information described above may be determined by the controller 122 at 308.

For example, at 308, the controller 122 may generate the travel path 202, the speed of the compaction machine 114a, various vibration frequencies and/or vibration amplitudes, and/or other components of the worksite plan 200 using one or more worksite plan models, algorithms, neural networks, look-up tables, and/or through one or more additional methods. The controller 122 may have an associated memory in which various compaction plan models, executable generation engines, algorithms, look-up tables, and/or other components may be stored for determining the worksite plan 200, travel path 202, and/or operating parameters of the compaction machine 114a based on one or more inputs. Such inputs may include, for example, the circumference and/or width of the drums of the compaction machine 114a, the mass of the compaction machine 114a, information indicative of the location of the perimeter 236 of the worksite surface 110, information indicative of one or more compaction requirements specific to the worksite surface 110, the stiffness, density, compactability, composition, moisture content (e.g., dryness/wetness), and/or other characteristics of the paving material 108, and/or any other received information.

In example embodiments, the worksite plan 200 may take various different forms. For example, the worksite plan 200 may comprise one or more text files, data files, video files, digital image files, thermal image files, and/or any other such electronic file that may be stored within a memory associated with the controller 122, that may be executed by the controller 122, and/or that may be transferred from the controller 122 to the controller 188 of the compaction machine 114a, to the controller 197 of a charging station196a, and/or to an electronic device 128 via the network 124. In some examples, the worksite plan 200 may comprise a graphical representation (e.g., a visible image) of the worksite 112, worksite surface 110, perimeter 236, compaction machine 114a, travel path 202, direction of travel of the compaction machine 114a, and/or other items or objects useful to an operator of the compaction machine 114a while performing a compaction operation. In any of the examples described herein, the worksite plan 200 may include various information corresponding to and/or indicative of the information received at steps 302-306, and/or of other information received during the compaction operation. Such a worksite plan 200 may also include additional information to assist, for example, an operator of the compaction machine 114a in adjusting operating parameters of the compaction machine 114a in order to optimize performance and/or efficiency. Such a worksite plan 200 may also include information to assist, for example, a foreman at the worksite 112 or a paving material plant employee manage haul truck delivery schedules, paving material plant temperatures, operation of other compaction and/or paving machines at the worksite 112, and/or other aspects of the compaction process in order to optimize performance and/or efficiency.

Moreover, in any of the examples described herein, the worksite plan 200 may include instructions which, when executed by the controller 188, cause the compaction machine 114a to perform and/or otherwise operate (e.g., traverse the travel path 202, operate the breakdown drum 176 at a specified frequency and/or amplitude, etc.) in accordance with the worksite plan 200. The worksite plan 200 may also include instructions which, when executed by the controller 197 of the charging station 196b, cause the charging station 196b to mate the coupling device 199 thereof with the coupling device 192 of the compaction machine 114a, and to direct fuel and/or energy to the energy storage device 190 of the compaction machine 114a via the coupling 199.

In any of the examples described herein, the travel path 202 of the worksite plan 200 and/or any of the return paths described herein (e.g., an example return path described below with respect to Step: 314), may comprise one or more predetermined travel paths. Such travel paths or return paths may be stored in a memory accessible by the controller 122. Additionally, or alternatively, the system controller 122 may determine one or more such travel paths 202 and/or return paths as part of the method 300. For example, as noted above, the system controller 122 may receive GPS coordinates and/or other information indicating the current location of the compaction machine 114a, the location, extent, and/or other configurations of the perimeter 236, and the location of the charging zone 194. The system controller 122 may use such information as inputs into, for example, one or more driving corridor algorithms, state lattice algorithms, Voronoi algorithms, or other path planning or non-linear optimization algorithms. For example, the system controller 122 may determine one or more of the travel path 202 and the return path using a predictive model based on one or more of the following equations below.

$$\min_{\substack{u_{1:N} \\ \lambda_{M \times N}}} \sum_{k=1}^{N} \Big\{ w_{gx} D_k^2(x_k) + w_{gy} D_k^2(y_k) + w_v \|v_d - v_k\|^2 + \qquad (1a)$$

$$w_a \|\alpha_k\|^2 + w_y \omega_k^2 + w_j \|\alpha_k - \alpha_{k-1}\|^2 + w_h (\theta_N - \theta_d)^2 +$$

$$w_c \sum_{j=1}^{M} \lambda_{j,k} h(x_k, y_k, p_c^j)^2 + w_p \sum_{j \in V} P(d_{j,k}^o, v_{j,k}^o) \Big\}$$

$$\text{s.t.} \quad z_{k+1} = z_k + f(z_k, u_k)T, \qquad (1b)$$

$$z_{k+1} \in \mathcal{Z}, u_k \in \mathcal{U}, \lambda \in \Lambda_{M \times N}, \qquad (1c)$$

$$g(z_{k+1}) \le 0, \qquad (1d)$$

$$k = 0, \ldots, N-1,$$

In such embodiments, example equation 1a may solve for one or more travel paths or sequential travel path segments based on a receding horizon, where N marks the prediction horizon, and M is the number of lanes (e.g., in the maneuver zone 246 and/or along the worksite surface 110) within which the compaction machine 114 may be permitted to travel. Further, in such embodiments, example equation 1b may solve for one or more constraints imposed by the kinematics of the compaction machine 114a; example equation 1c may define the speed limits of the worksite 112 and/or other operational constraints of the worksite 112; and example equation 1d may solve for one or more collision avoidance parameters associated with the compaction machine 114 and one or more stationary or moving objects disposed at the worksite 112. It is understood that the example equations noted above are merely example equations that may be used to determine at least part of the travel path 202 and/or the return path. In additional embodiments, one or more additional and/or different algorithms or other processes for determining such paths may be used by the system controller 122.

At 310, the system controller 122 may cause operation of the compaction machine 114a at the worksite 112 based at least in part on the worksite plan 200. For example, at 310, the controller 122 may provide the worksite plan 200 and/or instructions corresponding to the worksite plan 200 to the controller 188 of the compaction machine 114a via the network 124. Upon receiving the worksite plan 200 at 310, the controller 188 may cause the compaction machine 114a to travel to the start location 204, and to begin traversing the segment 210 of the travel path 202 in the direction of arrow 208. At 310, the controller 188 may also cause the compaction machine 188 to perform any additional operations included in the compaction plan 200 and/or in the instructions corresponding thereto.

One or more sensors of the compaction machine 114a may continuously and/or substantially continuously determine various operating parameters of the compaction machine 114a during performance of the worksite plan 200. For example, at 312 the location sensor 130 of the compaction machine 114a may determine the current location of the compaction machine 114a in real time. The location sensor 130 may also determine the speed, acceleration, deceleration, and/or other operating parameters of the compaction machine 114a. Additionally, at 312 the controller 188 and/or one or more sensors associated with the energy storage device 190 may determine an amount of available power stored in the energy storage device 190 in real time. In examples in which the energy storage device 190 comprises a fuel tank, such an amount of available power may comprise, for example, a fuel level. Alternatively, in example embodiments in which the energy storage device 190 comprises one or more rechargeable batteries, such an amount of available power may comprise a total amount of energy (e.g., kW, V, etc.) available for discharge by the batteries. In any of the examples described herein, such an amount of available power may include an additional buffer for safety purposes, and such a buffer may comprise a percentage (e.g., 10%, 15%, 20%, etc.) of the total capacity of the energy storage device 190. For instance, if the total capacity of the energy storage device 190 is equal to 100 kW, the amount of available power determined by the controller 188 and/or by a sensor operably connected to the energy storage device 190 when the energy storage device 190 is fully charged (and utilizing a buffer of 10%) may be 90 kW (e.g., 100 kW total capacity minus 10 kW safety buffer). In example embodiments, the current location of the compaction machine 114a, the current speed, acceleration, and/or deceleration of the compaction machine 114a, the amount of available power stored in the energy storage device 190, and/or other operating parameters may be referred to herein as "operating information." At 312, the controller 188 may direct one or more signals to the system controller 122 indicative of such operating information. Thus, at 312, the system controller 122 may receive such operating information in real time.

At 314, the system controller 122 may determine, based at least in part on the operating information received at 312, one or more return paths extending from a current location of the compaction machine 114a to the charging zone 194 located at the worksite 112. Such a return path may comprise a most direct and/or a most efficient travel path for the compaction machine 114a to travel, from a current location to the charging zone 194, without traversing a segment or other portion of the travel path 202 previously traversed by the compaction machine 114a during its current pass of the travel path 202. As described above, in some examples, the system controller 122 and/or the controller 188 of the compaction machine 114a may determine such a return path at the beginning of each segment of the travel path 202, at the end of each segment of the travel path 202, and/or at various locations along the travel path 202. In some example, the system controller 122 may determine one or more return paths at 314 substantially continuously as the compaction machine traverses the travel path 202. Further, the system controller 122 may determine such return paths in a manner similar to the process by which the travel path 202 is determined at 308. For instance, the system controller 122 may utilize the current location of the compaction machine 114a, the location of the charging zone 194, the travel path 202, the location of the various boundaries 238, 240, 242, 244 of the perimeter 236, the location, configuration, and/or extent of the maneuver zone 246, and/or other information as inputs into one or more algorithms, neural networks, look-up tables, and/or other travel path generation components in order to determine a desired return path. It is understood that in some examples, at least part of the return path determined at 314 may be defined by and/or may extend within a maneuver zone 246 of the worksite 112 surrounding at least part of the perimeter 236 and, that by traversing such a return path, the compaction machine 114 may avoid traversing one or more segments of the travel path 202 previously traversed by the compaction machine 114a during its current pass of the travel path 202.

At 316, the system controller may determine, based at least in part on the operating information received at 312, a return power required for the compaction machine 114a to traverse the return path. Such a return power may be determined based on a total distance of the return path and on a running average of power consumed by the compaction machine 114a during performance of the current worksite plan 202. For example, at 316, the system controller 122 may determine the total length of the return path using GPS coordinates or other indicators of the location and/or extent of the return path. At 316, the system controller 122 may also generate and/or otherwise determine the average power usage of the compaction machine 114a over the length of the travel path 202 that was previously traversed by the compaction machine 114a during its current pass (e.g., kW/mile). The system controller 122 may determine the return power at 316 by multiplying these two values. In further embodiments, on the other hand, various other computations or processes (e.g., look-up tables, neural networks, etc.) may be used by the system controller 122 to determine the return power.

At 318, the system controller 122 may determine whether the return power is greater than or equal to the amount of available power stored in the energy storage device 190. If at 318, the system controller 122 determines that the return power is greater than or equal to the amount of available power (318—Yes), the system controller 122 may, at 320, cause the compaction machine 114a to traverse the return path based at least in part on determining that the return power is greater than or equal to the amount of available power. For example, at 320, the system controller 122 may provide one or more signals to the controller 188 via the network 124, and such signals may contain instructions which, when executed by the controller 188, cause the compaction machine 114*a* to traverse the return path determined at 314 instead of continuing to traverse the travel path 202. By causing the compaction machine 114*a* to traverse the return path at 320, the compaction machine 114 may arrive at the charging zone 194 and may travel to an available charging station 196*b* for refueling/recharging. This process will be described in greater detail with respect to FIG. 4.

At 322, the system controller 122 may cause a second and/or an additional compaction machine 114*b* disposed within the charging zone 194 to depart and/or otherwise dispatch from the charging zone 194 based at least in part on cause the compaction machine 114*a* to traverse the return path at 320. For example, at 322 the system controller 122 may provide one or more signals to the controller 188 of the compaction machine 114*b* via the network 124, and such signals may contain instructions which, when executed by the controller 188 of the compaction machine 114*b*, cause the compaction machine 114*b* to travel from the charging station 196*a* of the charging zone 194 to the location along the travel path 202 at which the compaction machine 114*a* was controlled to begin traversing the return path at 320. At 324, the system controller 122 may cause operation of the compaction machine 114*b* at the worksite 112 based at least in part on the worksite plan 200. For example, at 324 the system controller 122 may provide one or more signals to the controller 188 of the compaction machine 114*b* via the network 124, and such signals may contain instructions which, when executed by the controller 188 of the compaction machine 114*b*, cause the compaction machine 114*b* to continue traversing the travel path 202 and to continue compacting the paving material 108 disposed there according to the compaction requirements, stiffness requirements, travel speeds, vibration frequencies, vibration amplitudes, and/or other parameters of the worksite plan 200. In this way, the compaction machine 114*b* may continue the compaction operations previously being performed by the compaction machine 114*a* while the compaction machine 114*a* is being refueled/recharged at the charging station 196*b*.

It is understood that in some examples, the compaction machine 114*b* may arrive at and/or proximate a current location of the compaction machine 114*a* at substantially the same time and/or in close temporal proximity (e.g., within 5 approximately minutes, within approximately 2 minutes, within approximately 1 minute, within approximately 30 seconds, within approximately 15 seconds, etc.) to the compaction machine 114*a* beginning to traverse the return path at 320. In such examples, the determinations made at one or more of Steps: 314, 316, 318 may be made by the system controller 122 based on an expected or predicted future location of the compaction machine 114*a* along the travel path 202. Such a future location of the compaction machine 114*a* may be a location along the travel path 202 at which the compaction machine 114*a* will be disposed when the compaction machine 114*b* arrives within a predetermined distance of the compaction machine 114*a* (e.g., 30 yards, 20 yards, 10 yards, etc.). Accordingly, such a future location may be determined by the system controller 122 based on an expected travel time of the compaction machine 122, and in order to minimize and/or substantially eliminate work stoppages at the worksite 112. It is also understood that, at 324, control of the compaction machine 114*b* may continue as described above with respect to Step: 312.

If at 318, the system controller 122 determines that the return power is less than the amount of available power (318—No), the system controller 122 may, at 326, determine whether the amount of available power is less than or equal to a power threshold. Such a power threshold may comprise a predetermined amount of power (e.g., 1 kW, 2 kW, 5 kW, 10 kW, etc.), a predetermined amount of fuel (1 gallon, 5 gallons, 10 gallons, etc.), and/or any other such threshold providing a minimum safety buffer for continued operation and return capacity for the compaction machine 114*a* at the worksite 112.

If at 326, the system controller 122 determines that the amount of available power stored in the energy storage device 190 of the compaction machine 114*a* is less than or equal to the power threshold described above (326—Yes), the system controller 122 may, at 320, cause the compaction machine 114*a* to traverse the return path based at least in part on determining that the amount of available power is less than or equal to the power threshold. For example, at 326, the system controller 122 may provide one or more signals to the controller 188 of the compaction machine 114*a* via the network 124, and such signals may contain instructions which, when executed by the controller 188, cause the compaction machine 114*a* to traverse the return path determined at 314 instead of continuing to traverse the travel path 202. As described above, by causing the compaction machine 114*a* to traverse the return path at 320, the compaction machine 114*a* may arrive at the charging zone 194 and may travel to an available charging station 196*b* for refueling/recharging. It is also understood that, as described above, from Step: 320 the system controller 122 may, at 322, cause the compaction machine 114*b* disposed within the charging zone 194 to dispatch from the charging zone 194 based at least in part on causing the compaction machine 114*a* to traverse the return path at 320. Further, as described above, at 324 the system controller 122 may cause operation of the compaction machine 114*b* at the worksite 112 based at least in part on the worksite plan 200.

If, at 326, the system controller 122 determines that that the amount of available power stored in the energy storage device 190 of the compaction machine 114*a* is greater than the power threshold described above (326—No), the system controller 122 may, at 328, determine whether a minimum progress threshold has been reached by the compaction machine 114*a*. For example, such a minimum progress threshold may comprise a minimum amount of compaction time (e.g., 2 hours, 2.5 hours, 3 hours, etc.), a minimum distance traveled/compacted along the travel path (e.g., 1 mile, 1.5 miles, 2 miles, etc., a minimum percentage of the travel path 202 that has been traversed by the compaction machine 114*a* during its current pass (e.g., 20%, 30%, 40%, 50%, etc.) and/or any other indication of progress associated with the travel path 202 and/or the worksite plan 200.

If, at 328, the system controller 122 determines that a current progress associated with the compaction machine 114*a* is less than the minimum progress threshold described above (328—No), control may continue to Step: 310 where, as described above, the system controller 122 may cause operation of the compaction machine 114*a* in accordance with and/or otherwise based on the worksite plan 200. However, if at 328, the system controller 122 determines that a current progress associated with the compaction machine 114*a* is greater than or equal to the minimum progress threshold described above (328—Yes), control may continue to Step: 330 where, similar to Step: 310, the system controller 122 may cause operation of the compaction machine 114*a* in accordance with and/or otherwise based on the worksite plan 200. It is also understood that from Step: 330, the system controller 122 may, at 322, cause the compaction machine 114b disposed within the charging zone 194 to dispatch from the charging zone 194 based at least in part on causing the compaction machine 114a to traverse the return path at 320. Further, as described above, at 324 the system controller 122 may cause operation of the compaction machine 114b at the worksite 112 based at least in part on the worksite plan 200. In this way, the system controller 122 may cause simultaneous and coordinated operation of multiple compaction machines 114a, 114b at the worksite 112. The method 300 described with respect to FIG. 3 may also enable coordinated refueling/recharging of various machines of the paving system 100 in order to minimize work stoppages and to maximize overall efficiency of the paving system 100.

Figure 4:
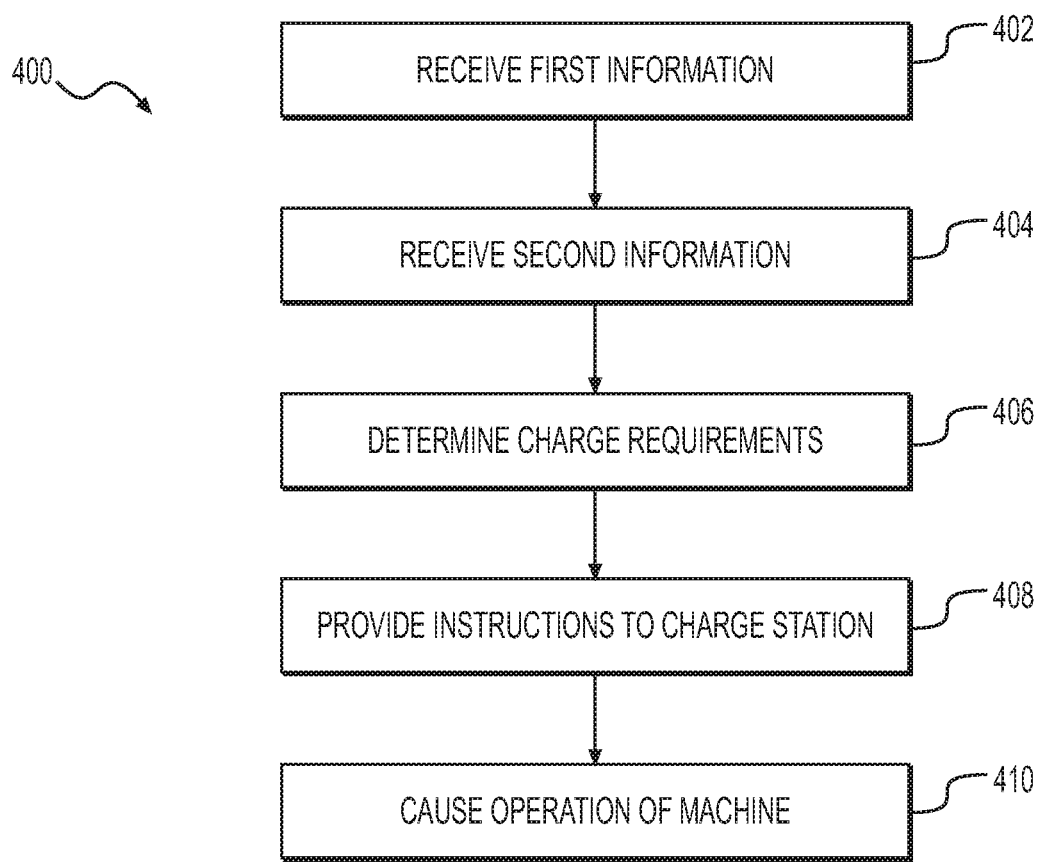
FIG. 4 is a flow chart depicting another example method associated with the paving system shown in FIG. 1.

FIG. 4 illustrates a flow chart depicting an example method 400 associated with the paving system 100. In particular, the flow chart of FIG. 4 illustrates an example method of coordinating the activities of various machines associated with the paving system 100 described above in order to recharge and/or refuel such machines while minimizing and/or substantially eliminating work stoppages. The example method 400 is illustrated as a collection of steps in a logical flow diagram, which represents operations that can be implemented in hardware, software, or a combination thereof. In the context of software, the steps represent computer-executable instructions stored in memory. When such instructions are executed by, for example, the controller 122, such instructions may cause the controller 122, various components of the control system 120, the paving material plant controller 144, the truck controller 154, the paving machine controller 172, the controller 188, the controller 197, and/or other components of the paving system 100 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 400 is described with reference to the paving system 100, the control system 120, the charging zone 194, and/or other items shown in FIGS. 1 and 2. In particular, although any part of and/or the entire method 400 may be performed by the truck controller 154, the paving machine controller 172, the paving material plant controller 144, the electronic device 128, the controller 188, the controller 197, and/or other components of the paving system 100, unless otherwise specified, the method 400 will be described below with respect to the system controller 122 for ease of description.

With reference to FIG. 4, at 402 the system controller 122 may receive first information associated with the compaction machine 114a traveling to the charging zone 194 along a return path. In such examples, the first information received at 402 may include, among other things, a license plate number, a vehicle identification number, and/or other information uniquely identifying the compaction machine 114a. In such examples, the first information may also include GPS coordinates and/or other information indicative of a current location of the compaction machine 114a, a current speed of the compaction machine 114a, a current amount of available power stored in the energy storage device 190 of the compaction machine 114a, a distance between the current location of the compaction machine 114a and the charging zone 194 (and/or an unoccupied charging station 196b of the charging zone 194), and/or any other information associated with the compaction machine 114a. In some examples, such first information received at 402 may include the operating information described above with respect to Step: 312 of FIG. 3. In any of the examples described herein, at 402 the controller 188 may provide one or more signals to the system controller 122 containing such first information.

At 404, the system controller 122 may receive second information associated with the charging zone 194. For instance, such second information may include, among other things, a number and/or identity of respective unoccupied charging stations (e.g., charging station 196b) located at the charging zone 194, GPS coordinates and/or other information indicative of the location of the respective unoccupied charging stations, a type of material (e.g., diesel fuel, compressed natural gas, compressed hydrogen, etc.), energy (e.g., electrical energy), and/or other resources available at the respective charging stations of the charging zone 194, configurations of the coupling devices 199 associated with the respective charging stations of the charging zone 194, and/or other information. In any of the examples described herein, at 404 the controllers 197 of the charging stations 196a, 196b, 196c may provide one or more respective signals to the system controller 122 containing such second information.

At 406, the system controller 122 may determine one or more charge requirements associated with the compaction machine 114a currently traveling to the charging zone 194. For instance, at 406 the system controller 122 may determine a capacity of the energy storage device 190 associated with the compaction machine 114a, a voltage requirement of the energy storage device 190, a type, location, and/or configuration of the coupling device 192 associated with the compaction machine 114a, and/or other such requirements. In such examples, the system controller 122 may determine such charge requirements using one or more data logs, look-up tables, or other components in which such charge requirements may be stored in association with the unique identifier information or other first information received at 402.

At 408, the system controller 122 may provide instructions to one or more charging stations of the charging zone 194 based at least in part on the charging requirements determined at 406. Such instructions may include configuration instructions which, when executed by the controller 197 of the charging station, cause the charging station to direct power to the energy storage device 190 of the compaction machine 114a. Such instructions may, for example, cause one or more motors or other actuators operably connected to the coupling device 199 to orient, position, maneuver, and/or otherwise configure the coupling device 199 to mate with the coupling device 192 of the compaction machine 114a upon arrival of the compaction machine 114a at the charging station. Such instructions may also include voltage specifications, current specifications, and/or other specifications indicating an acceptable manner for directing power to the energy storage device 190 of the compaction machine 114a. In some examples, the instructions provided at 408 may also include a length of time (e.g., a charge duration) during which the charging station may be controlled to provide fuel, power, and/or other materials to the compaction machine 114a. For example, at 408 the system controller 122 may identify an unoccupied charging station (e.g., charging station 196b) based at least in part on the second information received at 404. At 408, the system controller 122 may provide one or more signals to the unoccupied charging station 196b including the instructions described above. It is understood that, at 408, the controller 197 of the unoccupied charging station 196b may perform one or more operations (e.g., orienting the coupling device 199 to mate with the coupling device 192 of the compaction machine 114a upon arrival of the compaction machine 114a) based at least in part on such instructions.

At 410, the system controller 122 may cause the compaction machine 114a traveling to the charging zone 194 to enter the unoccupied charging station 196b. For instance, at 410 the system controller 122 may provide one or more signals to the controller 188 of the compaction machine 114a including instructions which, when executed by the controller 188, may cause the compaction machine to enter the charging station 196b and which may cause the coupling device 192 of the compaction machine 114a to mate with the coupling device 199 of the charging station 196b. Additionally, at 410, the instructions provided to the controller 197 of the charging station 196b at 408 may cause the charging station 196b to direct power to the energy storage device 190 of the compaction machine 114a at 410. In this way, the method 400 described with respect to FIG. 4 may be employed to ensure autonomous and/or semi-autonomous recharging/refueling of any of the machines described herein with respect to the paving system 100.

INDUSTRIAL APPLICABILITY

The present disclosure provides systems and methods for controlling the refueling and/or recharging of various machines included in a paving system 100, in a coordinated fashion, such that work stoppages can be minimized and/or avoided. For example, such systems and methods may enable a system controller 122 of a control system 120 to determine a return path extending from a current location of a particular machine (e.g., the compaction machine 114a described above with respect to at least FIG. 2) to a charging zone disposed at the worksite 112. Such systems and methods may also enable the system controller 112 to determine a return power required for the machine to traverse the return path from its current location. In examples in which the return power is determined to be greater than or equal to an amount of available power stored in an energy storage device 190 of the machine, the system controller 122 may cause the machine to traverse the return path such that the machine may be refueled/recharged. In such examples, the systems and methods of the present disclosure may also cause an additional machine (e.g., the compaction machine 114b) to dispatch from the charging zone 194 based at least in part on causing the primary machine (e.g., compaction machine 114a) to traverse the determined return path. By dispatching the additional machine, operation of the various paving system machines may be coordinated such that operations at the worksite 112 may be substantially uninterrupted even when recharging/refueling of the respective machines is required.

Operating the paving machines of the paving system 100 in this way may maximize efficiency at the paving worksite 112. Additionally, such coordinated refueling, recharging, and/or other operations of the paving system machines, as described above with respect to the methods 300, 400, may minimize and/or substantially eliminate paving, compaction, and/or other work stoppages during the paving process, thereby improving the consistency and quality of the resulting mat of paving material 108.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
receiving, with a controller, first information indicative of a paving plan associated with a worksite;
receiving, with the controller, second information indicative of a perimeter of the worksite;
generating, with the controller, a worksite plan based at least in part on the first information and the second information;
causing, with the controller, operation of a first autonomous machine at the worksite based at least in part on the worksite plan;
determining, with the controller, a return path extending from a current location of the first machine to a charging zone located at the worksite;
determining, with the controller, a return power required for the first machine to traverse the return path; and
causing, with the controller, the first machine to traverse the return path, from the current location to the charging zone, based on at least one of the return power and an amount of available power stored in an energy storage device of the first machine.

2. The method of claim 1, wherein the first information comprises at least one of a desired stiffness of paving material being acted on by the first machine at the worksite, and a desired number of passes of the first machine along a travel path at the worksite.

3. The method of claim 1, wherein generating the worksite plan comprises determining, with the controller, a travel path of the first machine based at least in part on the perimeter, the travel path being defined by a work surface of the worksite.

4. The method of claim 1, further comprising:
receiving, with the controller, third information indicative of at least one of a location of the charging zone, and an identity of a second autonomous machine disposed within the charging zone, the charging zone comprising a plurality of charging stations and the second autonomous machine being located at a first charging station of the plurality of charging stations,
wherein generating the worksite plan comprises generating the worksite plan based at least in part on the first information, the second information, and the third information.

5. The method of claim 1, further comprising receiving, with the controller, operating information from the first machine as the first machine performs a portion of the worksite plan, the operating information comprising the current location of the first machine and the amount of available power stored in the energy storage device.

6. The method of claim 1, wherein at least part of the return path extends within a maneuver zone of the worksite surrounding at least part of the perimeter.

7. The method of claim 1, further comprising determining, with the controller, that the return power is greater than or equal to the amount of available power stored in the energy storage device; and causing the first machine to traverse the return path based at least in part on determining that the return power is greater than or equal to the amount of available power.

8. The method of claim 1, further comprising:
determining, with the controller, that the return power is less than the amount of available power stored in the energy storage device;
determining, with the controller, that the amount of available power is less than or equal to a power threshold; and
causing, with the controller, the first machine to traverse the return path based at least in part on determining that the amount of available power is less than or equal to the power threshold.

9. The method of claim 1, further comprising:
causing, with the controller, a second autonomous machine disposed within the charging zone to dispatch from the charging zone based at least in part on causing the first machine to traverse the return path; and
causing, with the controller, operation of a second machine at the worksite based at least in part on the worksite plan.

10. The method of claim 1, further comprising:
determining, with the controller, charge requirements associated with the first machine;
providing, with the controller, instructions to a charging station of the charging zone based at least in part on the charge requirements; and
causing, with the controller, the first machine to enter the charging station, wherein when executed by a controller of the charging station, the instructions cause the charging station to direct power to the energy storage device of the first machine.

11. A paving system, comprising:
a compaction machine configured to act on paving material at a worksite, the compaction machine being powered, at least in part, by an energy storage device;
a location sensor connected to the compaction machine and configured to determine a current location of the compaction machine at the worksite;
a charging zone located at the worksite, the charging zone having a charging station configured to direct energy to the energy storage device; and
a controller configured to perform a plurality of operations, comprising:
generating a worksite plan based at least in part on a paving plan associated with the worksite,
causing operation of the compaction machine at the worksite based at least in part on the worksite plan,
determining a return path extending from the current location of the compaction machine to the charging zone,
determining a return power required for the compaction machine to traverse the return path, and
causing the compaction machine to traverse the return path, from the current location to the charging zone, based on at least one of the return power and an amount of available power stored in the energy storage device.

12. The paving system of claim 11, wherein:
the controller comprises a controller of a control system;
the controller is disposed remote from the worksite;
the compaction machine comprises an autonomous compaction machine; and
the controller is operably connected to a controller of the compaction machine, and a controller of the charging station, via a network.

13. The paving system of claim 11, wherein the energy storage device comprises a rechargeable battery, the compaction machine includes a first coupling device operably connected to the energy storage device, and the charging station includes a second coupling device configured to mate with the first coupling device, the plurality of operations further comprising:
causing the charging station to direct power to the energy storage device via the second coupling device.

14. The paving system of claim 11, wherein the compaction machine comprises a first compaction machine and the system further comprises a second compaction machine disposed within the charging zone, the plurality of operations further comprising:
determining that the return power is greater than or equal to the amount of available power,
causing the first compaction machine to traverse the return path based at least in part on determining that the return power is greater than or equal to the amount of available power, and
causing the second compaction machine to dispatch from the charging zone based at least in part on causing the first compaction machine to traverse the return path.

15. The paving system of claim 11, wherein the compaction machine comprises a first compaction machine and the system further comprises a second compaction machine disposed within the charging zone, the plurality of operations further comprising:
determining that the amount of available power is less than or equal to a power threshold,
causing the first compaction machine to traverse the return path based at least in part on determining that the amount of available power is less than or equal to the power threshold, and
causing the second compaction machine to dispatch from the charging zone based at least in part on causing the first compaction machine to traverse the return path.

16. A control system, comprising:
a first controller;
a second controller disposed on a compaction machine at a worksite;
a location sensor disposed on the compaction machine and operably connected to the second controller, the location sensor being configured to determine a current location of the compaction machine at the worksite;
a third controller operably connected to a charging station of a charging zone disposed at the worksite, the charging station being configured to direct power to an energy storage device of the compaction machine; and
a network configured to transmit signals between the first controller, the second controller, and the third controller, wherein the first controller is configured to:
provide first instructions to the second controller via the network which, when executed by the second controller, cause operation of the compaction machine at the worksite based at least in part on a worksite plan,
receive operating information via the network, the operating information including the current location of the compaction machine at the worksite and an amount of available power stored in an energy storage device of the compaction machine,
determine a return path extending from the current location of the compaction machine to the charging zone,
determine a return power required for the compaction machine to traverse the return path, and provide second instructions to the second controller via the network which, when executed by the second controller, cause the compaction machine to traverse the return path, from the current location to the charging zone, based on at least one of the return power and the amount of available power.

17. The control system of claim 16, wherein the first controller is further configured to generate the worksite plan based at least in part on information indicative of a perimeter of the worksite, wherein generating the worksite plan includes determining a travel path of the first machine defined by a work surface of the worksite.

18. The control system of claim 17, wherein the first controller is further configured to receive information indicative of at least one of a desired stiffness of paving material being acted on by the compaction machine at the worksite, and a desired number of passes of the compaction machine along a travel path at the worksite, and wherein the first controller is configured to generate the worksite plan based at least in part on the at least one of the desired stiffness and the desired number of passes.

19. The control system of claim 16, wherein the compaction machine comprises a first compaction machine and the system controller is further configured to:
  determine that the return power is greater than or equal to the amount of available power,
  cause the first compaction machine to traverse the return path based at least in part on determining that the return power is greater than or equal to the amount of available power, and
  provide instructions to a second compaction machine disposed within the charging zone which, when executed by a controller of the second compaction machine, cause the second compaction machine to dispatch from the charging zone.

20. The control system of claim 16, wherein the compaction machine comprises a first compaction machine and the system controller is further configured to:
  determine that the amount of available power is less than or equal to a power threshold,
  cause the first compaction machine to traverse the return path based at least in part on determining that the amount of available power is less than or equal to the power threshold, and
  provide instructions to a second compaction machine disposed within the charging zone which, when executed by a controller of the second compaction machine, cause the second compaction machine to dispatch from the charging zone.

* * * * *